US011267337B2

(12) United States Patent
Spadoni et al.

(10) Patent No.: US 11,267,337 B2
(45) Date of Patent: Mar. 8, 2022

(54) NOISE REDUCING SYSTEM FOR A TRACKED VEHICLE AND TRACKED VEHICLE

(71) Applicant: PRINOTH S.P.A., Vipiteno (IT)

(72) Inventors: Riccardo Spadoni, Vipiteno (IT); Martin Kirchmair, Pfons (AT); Gabriel Spielman, Vipiteno (IT)

(73) Assignee: PRINOTH S.P.A., Vipiteno (IT)

( * ) Notice: Subject to any disclaimer, the term of this patent is extended or adjusted under 35 U.S.C. 154(b) by 744 days.

(21) Appl. No.: 16/078,511

(22) PCT Filed: Feb. 23, 2017

(86) PCT No.: PCT/IB2017/051043
§ 371 (c)(1),
(2) Date: Aug. 21, 2018

(87) PCT Pub. No.: WO2017/145090
PCT Pub. Date: Aug. 31, 2017

(65) Prior Publication Data
US 2021/0201883 A1 Jul. 1, 2021

(30) Foreign Application Priority Data

Feb. 23, 2016 (IT) .................. 102016000018691

(51) Int. Cl.
*G10K 11/178* (2006.01)
*B62D 33/06* (2006.01)
(Continued)

(52) U.S. Cl.
CPC .......... *B60K 35/00* (2013.01); *B62D 33/0604* (2013.01); *B62D 33/0608* (2013.01);
(Continued)

(58) Field of Classification Search
CPC ............ B60K 35/00; G10K 11/17823; G10K 11/17857; G10K 11/17873;
(Continued)

(56) References Cited

U.S. PATENT DOCUMENTS

2004/0252846 A1* 12/2004 Nonaka ............ G10K 11/17857
381/71.4
2010/0152968 A1* 6/2010 Jones .................. B62D 33/0608
701/36
(Continued)

FOREIGN PATENT DOCUMENTS

| CN | 1573917 | 2/2005 |
|---|---|---|
| CN | 102282319 | 12/2011 |

(Continued)

OTHER PUBLICATIONS

European Office Action for Application No. 17 716 613.9 dated Mar. 27, 2020 (5 Pages).
(Continued)

*Primary Examiner* — Vivian C Chin
*Assistant Examiner* — Douglas J Suthers
(74) *Attorney, Agent, or Firm* — Neal, Gerber & Eisenberg LLP

(57) ABSTRACT

A noise reducing system for a tracked vehicle, the tracked vehicle comprising a cab and at least one track that extends along a direction of travel of the vehicle and comprises at least a plurality of bars, such as metal bars, transverse to the direction of travel. The noise reducing system comprising a control unit and an acoustic wave emitter connected to the control unit for being controlled by the control unit, the noise reducing system comprising an acoustic input and being configured to emit an acoustic equalization wave, phase shifted with respect to the noise and determined on the
(Continued)

basis of the acoustic input, to reduce the noise, in particular the noise generated by the tracks.

27 Claims, 3 Drawing Sheets

(51) Int. Cl.
*B62D 55/06* (2006.01)
*E02F 9/02* (2006.01)
*E02F 9/16* (2006.01)
*B60K 35/00* (2006.01)
*E02F 3/96* (2006.01)

(52) U.S. Cl.
CPC .............. *B62D 55/06* (2013.01); *E02F 9/02* (2013.01); *E02F 9/163* (2013.01); *E02F 9/166* (2013.01); *G10K 11/17823* (2018.01); *G10K 11/17857* (2018.01); *G10K 11/17873* (2018.01); *G10K 11/17883* (2018.01); *G10K 11/17885* (2018.01); *E02F 3/961* (2013.01); *G10K 2210/12821* (2013.01); *G10K 2210/3011* (2013.01); *G10K 2210/3027* (2013.01); *G10K 2210/3044* (2013.01)

(58) Field of Classification Search
CPC ....... G10K 11/17885; G10K 11/17883; G10K 2210/12821; G10K 2210/3011; G10K 2210/3027; G10K 2210/3044; B62D 33/0604; B62D 33/0608; B62D 55/06; E02F 9/02; E02F 9/163; E02F 9/166; E02F 3/961

USPC ...................................................... 180/9.23
See application file for complete search history.

(56) References Cited

U.S. PATENT DOCUMENTS

2013/0243214 A1  9/2013  Penketh et al.
2013/0315409 A1* 11/2013  Inoue ............... G10K 11/17883
                                                    381/71.1

FOREIGN PATENT DOCUMENTS

| CN | 102481878 | 5/2012 |
| CN | 103426427 | 12/2013 |
| CN | 103607982 | 2/2014 |
| EP | 2 667 380 | 11/2013 |
| JP | 2009-298289 | 12/2009 |
| WO | WO 90/09655 | 8/1990 |
| WO | WO 2012/153294 | 11/2012 |

OTHER PUBLICATIONS

Chinese Office Action and Search Report for Application No. 201780002835.2 dated Mar. 31, 2021 (12 pages).
Notification Concerning Submission, Obtention or Transmittal of Priority Document for International Application No. PCT/IB2017/051043 dated Apr. 21, 2017.
Notification of Transmittal of the International Search Report and the Written Opinion for International Application No. PCT/IB2017/051043 dated Oct. 11, 2017.

\* cited by examiner

| V | f | A |
|---|---|---|
| $V_1$ | $f_1$ | $A_1$ |
| $V_2$ | $f_2$ | $A_2$ |
| $V_3$ | $f_3$ | $A_3$ |
| ... | ... | ... |
| ... | ... | ... |
| ... | ... | ... |
| ... | ... | ... |
| $V_n$ | $f_n$ | $A_n$ |

FIG. 3

| V | f |
|---|---|
| $V_1$ | $f_1$ |
| $V_2$ | $f_2$ |
| $V_3$ | $f_3$ |
| ... | ... |
| ... | ... |
| ... | ... |
| ... | ... |
| $V_n$ | $f_n$ |

FIG. 4

NOISE REDUCING SYSTEM FOR A TRACKED VEHICLE AND TRACKED VEHICLE

PRIORITY CLAIM

This application is a national stage application of PCT/IB2017/051043, filed on Feb. 23, 2017, which claims the benefit of and priority to Italian Patent Application No. 102016000018691, filed on Feb. 23, 2016, the entire contents of which are each incorporated by reference herein.

TECHNICAL FIELD

The present disclosure relates to a noise reducing system for a tracked vehicle and a tracked vehicle, for example for grooming ski runs.

BACKGROUND

In general, a tracked vehicle comprises at least one track, which extends along a direction of travel of the vehicle and that, in turn, comprises a rubber belt and a plurality of bars transverse to the direction of travel of the vehicle. In addition, the tracked vehicle comprises a chassis and a cab coupled to the chassis. The cab is connected to the chassis by elastic elements configured to dampen the vibrations caused by the tracks and which propagate to the cab.

One drawback of certain of the known art is that when the tracked vehicle moves along the direction of travel, the transverse bars of the track create vibration on the chassis having a frequency correlated to the speed of travel. This vibration is transmitted from the chassis to the cab and, in certain frequency ranges, these vibrations can be quite annoying for the driver and create noise in the cab that reduces driving comfort for the driver of the tracked vehicle.

SUMMARY

One advantage of the present disclosure is to provide a noise reducing system for a tracked vehicle, the tracked vehicle comprising a cab and at least one track that extends along a direction of travel of the vehicle and comprises at least a plurality of bars, such as metal bars, transverse to the direction of travel. The noise reducing system comprising a control unit and an acoustic wave emitter connected to the control unit for being controlled by the control unit, the noise reducing system comprising an acoustic input and being configured to emit an acoustic equalization wave, phase shifted with respect to the noise and determined on the basis of the acoustic input, to reduce the noise, in particular the noise generated by the tracks.

It should be appreciated that the noise reducing system of the present disclosure, once installed on the tracked vehicle and more specifically inside the cab, ensures driving comfort for the driver because the noise generated by the tracks and perceived by the driver is reduced. Furthermore, the noise reducing system has the advantage of being installable on the tracked vehicle both in the production phase of the tracked vehicle and afterwards, on already existing tracked vehicles as a retrofit. Another advantage of the noise reducing system is its adaptability to the noise created by the tracks of the tracked vehicle. It should be appreciated that the characteristics of the noise created by the tracks are only determinable after the tracked vehicle has been assembled and cannot be determined beforehand, when configuring the tracked vehicle, because it is very complex to calculate how vibration will be transmitted from the tracks to the cab and what will be the resonant frequencies of the cab. It should be further appreciated that the vibrations that create noise that is annoying for the driver are mainly those that have a frequency corresponding to one or more oscillating modes of the cab and/or which coincide with the resonant frequencies of the cab. When it is found that the noise transmitted into the cab is not bearable for the driver, the noise reducing system consequently enables reducing the noise of the tracked vehicle without the need to reconfigure the cab or the tracks.

According to one embodiment, the noise reducing system comprises a microphone that defines the acoustic input and is connected to the control unit to provide a first signal correlated to the noise to the control unit.

According another embodiment, the control unit is configured to emit the acoustic equalization wave on the basis of the phase of the first signal to reduce the noise.

According to one embodiment, the control unit is configured to emit the acoustic equalization wave on the basis of the amplitude of the noise detected through the first signal.

According to another embodiment, the control unit is configured to emit the acoustic equalization wave on the basis of the frequency of the noise detected through the first signal.

According to another embodiment, the noise reducing system comprises a second input to receive a second signal correlated to the speed of travel of the tracked vehicle, the noise reducing system being configured to emit the acoustic equalization wave on the basis of the second signal to reduce the noise, and in certain embodiments, to define the frequency or the frequency and amplitude of the acoustic equalization wave on the basis of the second signal.

According to another embodiment, the noise reducing system comprises a third input to receive a third signal correlated to the speed in revolutions of an engine of the tracked vehicle, the noise reducing system being configured to emit an acoustic equalization wave on the basis of the third signal to reduce the noise, and, in certain embodiments, to define the frequency of the acoustic equalization wave on the basis of the third signal.

According to another embodiment, the noise reducing system comprises a fourth input to receive a fourth signal correlated to a signal of a radio system, the sound reducing system being configured to emit the acoustic equalization wave on the basis of the fourth signal so as not to reduce the audibility of the radio system.

According to another embodiment, the noise reducing system comprises a memory comprising a plurality of pairs of values, wherein each pair of values comprises a speed value of the tracked vehicle and a frequency value of the acoustic equalization wave associated with the speed value, the control unit being connected to the memory and being configured to define the frequency of the acoustic equalization wave on the basis of one of the pairs of values selected on the basis of the second signal.

According to another embodiment, the noise reducing system comprises a memory comprising a plurality of sets of three values, wherein each set of three values comprises a speed value of the tracked vehicle and a frequency value and amplitude value of the associated acoustic equalization wave, the control unit being connected to the memory and being configured to define the frequency of the acoustic equalization wave on the basis of one of the sets of three values selected on the basis of the second signal.

According to another embodiment, the acoustic wave emitter is configured to emit acoustic equalization waves within the frequency range from 0 to 100 Hz, and in certain embodiments, from 0 to 50 Hz.

According to another embodiment, the acoustic wave emitter is a loudspeaker, in particular of the subwoofer type, having a capacity of at least 20 liters of air.

According to another embodiment, the acoustic wave emitter is part of the radio system of the tracked vehicle.

Another advantage of the present disclosure is to provide a tracked vehicle that reduces certain of the drawbacks of certain of the known art.

According to the present disclosure, a tracked vehicle is provided that comprises a cab, at least one track that extends along a direction of travel of the vehicle and comprises a plurality of bars, such as metal bars, transverse to the direction of travel, a chassis connected to the tracks and to the cab, and a noise reducing system as disclosed herein housed inside the cab.

According to another embodiment, the tracked vehicle comprises a speed detector, the noise reducing system being connected to the speed detector to receive the speed value of the vehicle via the second signal.

According to another embodiment, the tracked vehicle comprises an engine speed sensor, the noise reducing system being connected to the engine speed sensor to receive the engine speed value via the third signal.

According to another embodiment, the tracked vehicle comprises a radio system, the noise reducing system being connected to the radio system to receive a fourth signal associated with the radio system.

According to another embodiment, the plurality of transverse bars are spaced from one another by a given or designated pitch, the noise reducing system being configured to define the frequency of the acoustic equalization wave on the basis of the given pitch; the pitch is, in certain embodiments, in the range from 100 mm to 160 mm, such as from 118 mm to 144 mm.

According to another embodiment, the tracked vehicle comprises an elastic system configured to connect the cab to the chassis to dampen vibrations from the chassis, the elastic system, in certain embodiments, comprising a silent block and/or a gas spring.

According to another embodiment, the cab comprises a roof and a compartment obtained in the roof and inside the cab, the noise reducing system being housed in the compartment.

According to another embodiment, the tracked vehicle comprises a door, and the acoustic wave emitter is housed in the door.

According to another embodiment, the cab comprises a driver's seat and a rear panel behind the driver's seat, with the acoustic wave emitter housed in the rear panel.

Additional features and advantages are described in, and will be apparent from the following Detailed Description and the figures.

BRIEF DESCRIPTION OF THE DRAWINGS

Other characteristics and advantages of the present disclosure will become clear from the description that follows of a non-limitative embodiment, with reference to the accompanying drawings, in which:

FIG. 3 is a table comprising a plurality of sets of three values stored in a memory of the noise reducing system in FIG. 2; and FIG. 4 is a table of an alternative embodiment to that in FIG. 3 and comprises a plurality of pairs of values stored in a memory of the noise reducing system in FIG. 2.

DETAILED DESCRIPTION

Figure 1:
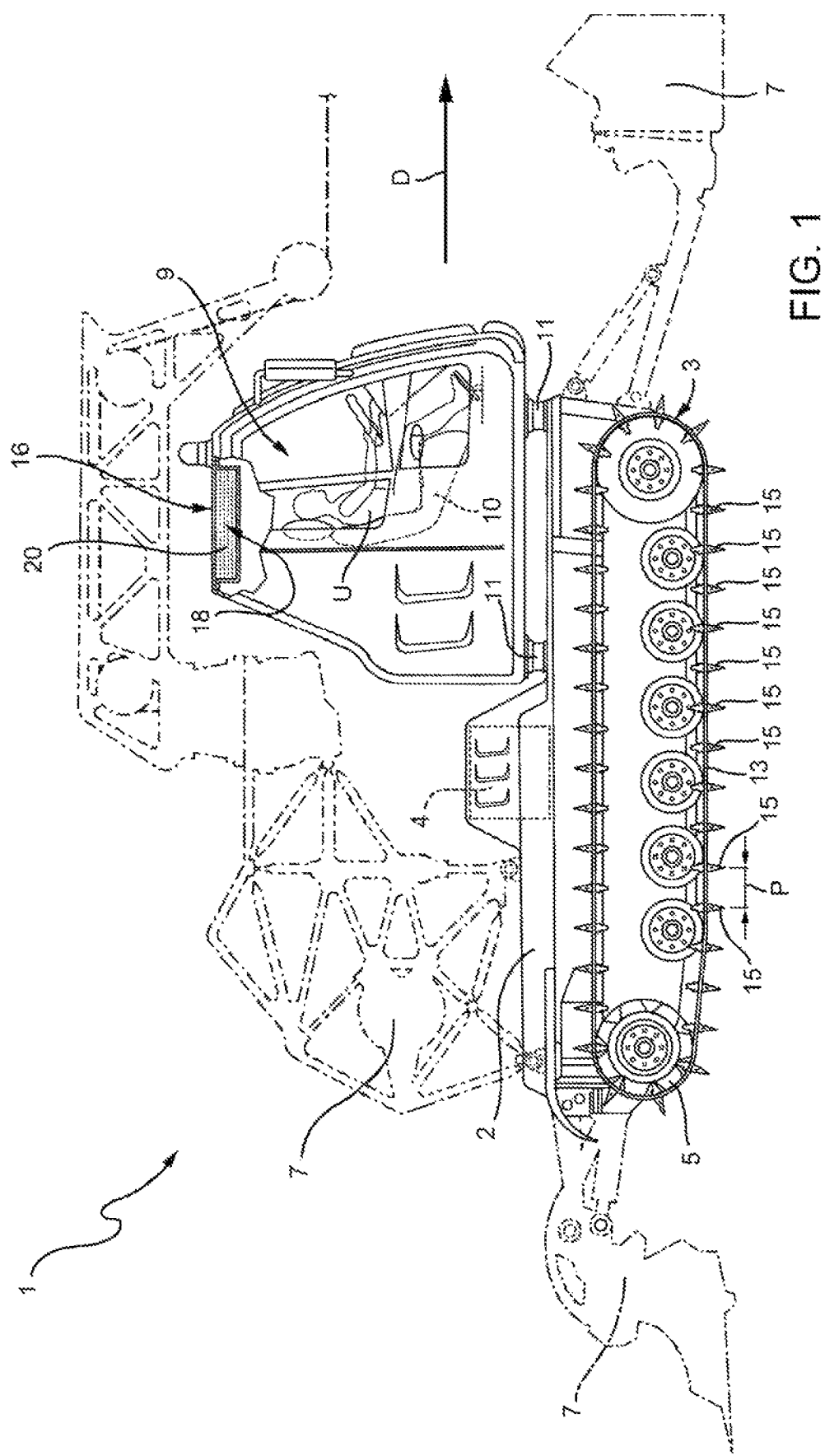
FIG. 1 is a side elevation view, with parts removed for clarity, of a tracked vehicle made in accordance with the present disclosure.

Referring now to the example embodiments of the present disclosure illustrated in FIGS. 1 to 4 and specifically referring to FIG. 1, reference numeral 1 indicates, as a whole, a tracked vehicle configured to groom ski runs and configured to move along a direction of travel D. The tracked vehicle 1 comprises a chassis 2, two tracks 3, an engine 4 configured to generate mechanical energy, two mutually independent drive wheels 5 respectively coupled to the tracks 3 and the engine 4 to transfer mechanical energy from the engine 4 to the tracks 3, a cab 9, an elastic system 11 that couples the cab 9 to the chassis 2, and a noise reducing system 20 housed inside the cab 9. Furthermore, the two drive wheels 5 and the tracks 3 are coupled to the chassis 2.

The tracked vehicle 1 may comprise a group of work devices 7, shown with broken lines. The group of work devices 7 may comprise a shovel, a cutter and a winch.

The elastic system 11 is configure to dampen the vibrations transmitted from the chassis 2 to the cab 9 and comprises silent blocks and/or gas springs.

Each track 3 extends along the direction of travel D and comprises a rubber belt 13 and a plurality of bars 15 transverse to the direction of travel D, arranged along the rubber belt 13 and spaced from one another by a given or designated pitch P. The transverse bars are made of metal. In certain non-limitative embodiment of the present disclosure, the pitch P is in the range from 100 mm to 160 mm. In one such embodiment, the pitch P in the range from 118 mm to 144 mm.

In the non-limitative embodiment of the present disclosure shown in the accompanying figures, the track 3 comprises a cleat arranged on each transverse bar 15.

The cab 9 comprises a driver's seat 10 configured to accommodate a driver U and a roof 16.

In addition, the cab 9 comprises a compartment 18 inside the cab 9 and made in the roof 16. In other words, the compartment 18 is obtained on the side of the roof 16 facing the inside of the cab 9.

Figure 2:
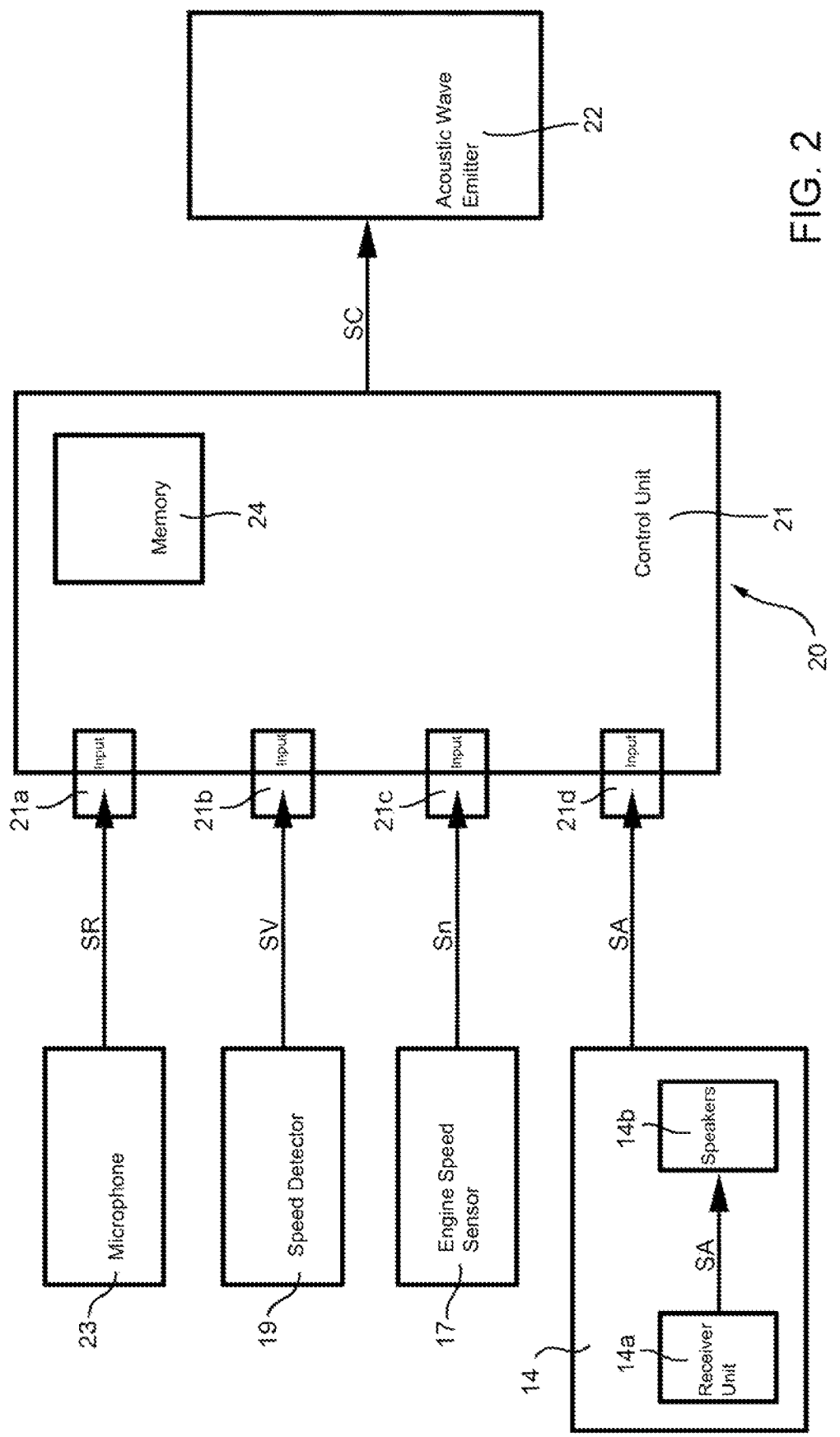
FIG. 2 is a block diagram of a noise reducing system for the tracked vehicle in FIG. 1.

Referring to FIG. 2, the tracked vehicle 1 comprises a speed detector 19 configured to detect the speed of travel of the tracked vehicle 1 and to emit a speed signal SV correlated to the speed of travel of the tracked vehicle 1.

Furthermore, the tracked vehicle 1 comprises an engine speed sensor 17 configured to emit an engine speed signal Sn correlated to the speed in revolutions of the engine 4.

In addition, the tracked vehicle 1 comprises a radio system 14 installed in the cab 9 and comprising a receiver unit 14a and speakers 14b. The radio system 14 has the purpose of providing infotainment for the driver U through music, radio news and/or other services. In addition, the radio system 14 could comprise a radio communications system usable by the driver U to communicate via a radio frequency system, in which case the radio system comprises a microphone. The radio communications system can be of the citizen band (so-called CB) type, which uses a radio frequency band around 27 MHz. In another embodiment, the radio communications system could be of the type that uses the VHF or UHF frequency bands.

The receiver unit 14*a* is connected to the speakers 14*b* and sends a signal SA to the speakers 14*b*.

Referring to FIG. 2, the noise reducing system 20 comprises a control unit 21 and an acoustic wave emitter 22 connected to the control unit 21 for being controlled by the control unit 21.

In greater detail, the noise reducing system 20 comprises a microphone 23 that defines an acoustic input of the noise reducing system 20. The microphone 23 is connected to the control unit 21 by an input 21*a* of the control unit 21 and provides a signal SR to the control unit 21 that is correlated to the detected noise. The microphone 23 is housed inside the cab 9 near to the driver's seat 10 so as to detect the noise perceived by the driver U.

The noise reducing system 20 is connected to the speed detector 19 to receive the value of the speed of travel of the tracked vehicle 1. In greater detail, the control unit 21 comprises an input 21*b* to receive the speed signal SV from the speed detector 19.

Referring to FIGS. 2 and 3, the control unit 21 comprises a memory 24 in which a plurality of sets of three values V, f and A, are stored. Each set of three values V1, f1, A1; V2, f2, A2; . . . ; Vn, fn, An, comprises a speed value V of the tracked vehicle 1 and a frequency value f and amplitude value A of an acoustic equalization wave associated with each other. In an alternative embodiment of the present disclosure, the control unit 21 comprises a memory 24 in which a plurality of sets of three value groups V, f and A are stored. Each set of three value groups V1, f1, A1; V2, f2, A2; . . . ; Vn, fn, An, comprises a speed value V of the tracked vehicle 1 and a group of frequency values f and a group of amplitude values A of an acoustic equalization wave associated with each other. In greater detail, the group of frequency values f comprises the frequency values of the various components of the noise frequency spectrum. The group of amplitude values A comprises the amplitude values of the various components of the noise frequency spectrum.

The control unit 21 is configured to define an acoustic equalization wave able to reduce the noise; in particular, the acoustic equalization wave has the same waveform as the acoustic noise wave that it wished to compensate and is phase shifted with respect to the acoustic noise wave by 180°. To this end, the control unit 21 defines a compensation signal SC to send to the acoustic wave emitter 22 to emit the acoustic equalization wave to reduce the noise.

The control unit 21 determines the frequency f and amplitude A of the acoustic equalization wave and of the compensation signal SC on the basis of the value of the speed of travel V detected by the speed detector 19. In greater detail, the control unit 21 derives the frequency f and amplitude A of the acoustic equalization wave from the set of three values V, f and A that has the speed value V equal to the detected speed value. The control unit 21 thus selects one of the sets of three values V, f and A on the basis of the speed signal SV and determines the frequency f and amplitude A of the compensation signal SC from the frequency value f of the selected set of three values V, f and A.

In addition, the control unit 21 determines the phase of the equalization wave on the basis of the acoustic input signal. In greater detail, the noise reducing system 20 detects the noise via the microphone 23 that determines the SR signal, and the control unit 21 derives the phase of the SR signal and determines the phase of the compensation signal SC so that the acoustic equalization wave is phase shifted 180° with respect to the detected acoustic noise wave. In this way, the acoustic equalization wave defined by the compensation signal SC will reduce the noise perceived by the driver U.

In another embodiment shown in FIG. 4, the memory 24 stores a plurality of pairs of values V, f Each pair of values V1, f1; V2, f2; . . . ; Vn, fn, comprises a speed value V of the tracked vehicle 1 and a frequency value f of an acoustic equalization wave paired with the speed value V. In this embodiment, the control unit 21 determines the frequency f of the acoustic equalization wave and of the compensation signal SC on the basis of the value of the speed of travel V detected by the speed detector 19. In greater detail, the control unit 21 derives the frequency f of the acoustic equalization wave from the pair of values V and f that has the speed value V equal to the detected speed value. The control unit 21 thus selects one of the pairs of values V and f on the basis of the speed signal SV and determines the frequency f of the compensation signal SC from the frequency value f of the selected pair of values V and f. The control unit 21 determines the phase and amplitude A of the equalization wave on the basis of the acoustic input signal. In greater detail, the noise reducing system 20 detects the noise via the microphone 23 that determines the SR signal, and the control unit 21 derives the phase of the SR signal and the amplitude of the SR signal and determines the phase of the compensation signal and the amplitude of the compensation signal SC so that the acoustic equalization wave is phase shifted 180° with respect to the detected acoustic noise wave and has an amplitude A equal to the noise that it is wished to cancel.

In an alternative embodiment of the present disclosure, the control unit 21 comprises a memory 24 in which a plurality of pairs of value groups V and f are stored. Each pair of value groups V1, f1; V2, f2; . . . ; Vn, fn, comprises a speed value V of the tracked vehicle 1 and a group of frequency values f paired with the speed of travel value V. In greater detail, the group of frequency values f comprises the frequency values of the various components of the frequency spectrum of the noise that occurs at a given or designated speed V and which it is wished to cancel.

In an alternative embodiment of the present disclosure, the control unit 21 calculates the frequency f of the compensation signal on the basis of the speed of travel V and the given pitch P. In greater detail, the control unit 21 calculates the frequency f of the compensation signal SC on the basis of the speed signal SV and the given pitch P. In particular, the control unit 21 calculates the frequency f of the compensation signal SC on the basis of a first function that is a function of the speed signal SV and the given pitch P. Furthermore, in this embodiment, the control unit 21 determines the phase and amplitude of the equalization wave on the basis of the acoustic input signal. In greater detail, the control unit 21 determines the phase of the compensation signal SC and the amplitude A of the compensation signal SC from the SR signal so that the acoustic equalization wave is phase shifted 180° with respect to the detected acoustic noise wave and has an amplitude equal to the noise.

In another alternative embodiment of the present disclosure, the input 21*b* of the speed signal SV is omitted and the control unit 21 determines the phase, frequency f and amplitude A of the equalization wave on the basis of the phase of the SR signal, the frequency of the SR signal and the amplitude of the SR signal. In greater detail, the control unit 21 performs a fast Fourier transform (FFT) on the SR signal and derives the frequency f and amplitude A of the noise component it is wished to cancel. In an alternative embodiment, the control unit 21 derives the frequencies f and amplitudes A of the components of the noise spectrum from the fast Fourier transform.

The control unit 21 defines the compensation signal SC on the basis of the detected frequency f, the detected amplitude A and the detected phase, all detected via the microphone 23.

In one embodiment, the noise reducing system 20 is connected to the engine speed sensor 17 to receive the engine speed value of the engine 4. In this embodiment, the noise reducing system 20 comprises an input 21c to receive the engine speed signal Sn, which is correlated to the speed in revolutions of the engine 4 of the tracked vehicle 1. The control unit 21 is configured to define the acoustic equalization wave also on the basis of the engine speed signal Sn to reduce the noise. In particular, the control unit 21 defines the frequency f of the compensation signal SC on the basis of the engine speed signal Sn.

In one embodiment, the noise reducing system 20 is connected to the radio system 14 to receive the SA signal and has an input 21d to receive the SA signal. The control unit 21 determines the compensation signal SC also on the basis of the SA signal so as not to equalize the SA signal. In other words, the SA signal, which is also detected via the microphone 23, is not equalized by the control unit 21. In greater detail, by excluding the frequencies and/or the phase deriving from the SA signal from the compensation process, the control unit 21 will emit a compensation signal SC that will not have a component equal to and in antiphase with the SA signal. In this way, the noise reducing system 20 does not reduce the audibility of the radio system 14 for the driver U.

In certain of the embodiments, the acoustic equalization wave has a frequency ranging from 0 to 100 Hz, such as from 0 to 50 Hz. In consequence, the acoustic wave emitter 22 is configured to emit acoustic waves in the frequency range 0 to 100 Hz, such as 0 to 50 Hz. To this end, the acoustic wave emitter 22 is a speaker, more specifically of the subwoofer type, having a capacity of at least 20 liters of air. In particular, the acoustic wave emitter is housed in the compartment.

In the embodiment shown in FIG. 1, the noise reducing system 20 is housed in the compartment 18. This characteristic has the advantage that it is not necessary to reconfigure the cab 9 to insert the noise reducing system 20 or the acoustic wave emitter 22 and, in consequence, the noise reducing system 20 can be applied to already existing tracked vehicles 1 as a retrofit.

In one embodiment (not shown in the accompanying figures), the speakers 14b of the radio system 14 define the acoustic wave emitter 22, and the control unit 21 consequently provides the compensation signal SC to the radio system 14. The radio system 14 emits the acoustic equalization wave via the speaker 14b on the basis of the compensation signal SC received from the control unit 21.

In one embodiment (not shown in the accompanying figures), the cab comprises a door and the acoustic wave emitter is housed in the door.

In another embodiment (not shown in the accompanying figures), the cab comprises a rear panel located behind the driver's seat, with the acoustic wave emitter housed in the rear panel.

It should be appreciated that the tracked vehicle 1 of the present disclosure offers excellent driving comfort for the driver U, who does not perceive the noise caused by the tracks 3. Furthermore, the noise reducing system 20 of the present disclosure can be installed in already existing tracked vehicles 1, thereby increasing comfort for the driver U. This characteristic enables having a system that is relatively easy to install and not having to reconfigure the entire tracked vehicle 1 when it is found that the tracked vehicle 1 generates noise in the cab 9 that is not bearable by a driver U.

Furthermore, it is evident that the present disclosure also covers embodiments not described in the detailed description and equivalent embodiments that fall within the scope of the appended claims. As such, the present disclosure also covers embodiments not described in the detailed description and equivalent embodiments that fall within scope of the appended claims. Accordingly, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A noise reducing system for a tracked vehicle comprising a cab and at least one track that extends along a direction of travel of the tracked vehicle, the at least one track comprising a plurality of bars transverse to the direction of travel of the tracked vehicle, the noise reducing system comprising:
   a control unit;
   an acoustic input;
   an acoustic wave emitter connected to and controlled by the control unit, the acoustic wave emitter configured to emit an acoustic equalization wave to reduce a noise generated by the at least one track, the acoustic equalization wave being phase shifted with respect to the noise and being determined based on the acoustic input;
   an input configured to receive a signal correlated to a speed of travel of the tracked vehicle, wherein to reduce the noise, the emitted acoustic equalization wave is based on the signal correlated to the speed of travel of the tracked vehicle; and
   a memory device that stores a plurality of pairs of values, wherein each pair of values comprises a speed value of the tracked vehicle and a frequency value of the acoustic equalization wave associated with the speed value, and the control unit is connected to the memory device and configured to define a frequency of the emitted acoustic equalization wave based on one of the pairs of values selected based on the signal correlated to the speed of travel of the tracked vehicle.

2. The noise reducing system of claim 1, wherein the acoustic input comprises a microphone connected to the control unit and configured to provide, to the control unit, a signal correlated to the noise.

3. The noise reducing system of claim 2, wherein to reduce the noise, the emitted acoustic equalization wave is based on a phase of the signal correlated to the noise.

4. The noise reducing system of claim 2, wherein the emitted acoustic equalization wave is based on an amplitude of the noise detected through the signal correlated to the noise.

5. The noise reducing system of claim 2, wherein the emitted acoustic equalization wave is based on a frequency of the noise detected through the signal correlated to the noise.

6. The noise reducing system of claim 1, wherein one of: the frequency of the emitted acoustic equalization wave and the frequency and an amplitude of the emitted acoustic equalization wave is based on the signal correlated to the speed of travel of the tracked vehicle.

7. The noise reducing system of claim 1, wherein the input is further configured to receive a signal correlated to a speed, in revolutions, of an engine of the tracked vehicle, wherein to reduce the noise, the emitted acoustic equalization wave is based on the signal correlated to the speed, in revolutions, of the engine of the tracked vehicle.

8. The noise reducing system of claim 7, wherein the frequency of the emitted acoustic equalization wave is based on the signal correlated to the speed, in revolutions, of the engine of the tracked vehicle.

9. The noise reducing system of claim 1, wherein the input is further configured to receive a signal correlated to a radio signal of a radio system, wherein the emitted acoustic equalization wave is based on the signal correlated to the radio signal of the radio system so as not to reduce an audibility of the radio system.

10. The noise reducing system of claim 1, wherein the acoustic wave emitter is configured to emit acoustic equalization waves within a frequency of ranges from 0 to 100 Hz.

11. The noise reducing system of claim 1, wherein the acoustic wave emitter is configured to emit acoustic equalization waves within a frequency of ranges from 0 to 50 Hz.

12. The noise reducing system of claim 1, wherein the acoustic wave emitter comprises a loudspeaker.

13. The noise reducing system of claim 12, wherein the loudspeaker comprises a subwoofer type loudspeaker having a capacity of at least 20 liters of air.

14. The noise reducing system of claim 1, wherein the plurality of bars of the at least one track comprise a plurality of metal bars.

15. A tracked vehicle comprising:
a cab;
at least one track that extends along a direction of travel of the tracked vehicle, the at least one track comprising a plurality of metal bars transverse to the direction of travel, wherein the plurality of transverse bars are spaced from one another by a designated pitch in a range from 100 mm to 160 mm;
a chassis connected to the at least one track and to the cab; and
a noise reducing system housed in the cab and configured to define a frequency of an emitted acoustic equalization wave based on the designated pitch, the noise reducing system comprising:
a control unit,
an acoustic input, and
an acoustic wave emitter connected to and controlled by the control unit, the acoustic wave emitter configured to emit the acoustic equalization wave to reduce a noise generated by the at least one track, the acoustic equalization wave being phase shifted with respect to the noise and being determined based on the acoustic input.

16. The tracked vehicle of claim 15, further comprising a speed detector connected to the noise reducing system, wherein the noise reducing system is configured to receive a speed value of the tracked vehicle via a signal.

17. The tracked vehicle of claim 15, further comprising an engine speed sensor connected to the noise reducing system, wherein the noise reducing system is configured to receive an engine speed value via a signal.

18. The tracked vehicle of claim 15, further comprising a radio system connected to the noise reducing system, wherein the noise reducing system is configured to receive a signal associated with the radio system.

19. The tracked vehicle of claim 15, wherein the plurality of transverse bars are spaced from one another by a designated pitch in a range from 118 mm to 144 mm.

20. The tracked vehicle of claim 15, further comprising an elastic system configured to connect the cab to the chassis to dampen vibrations from the chassis to the cab.

21. The tracked vehicle of claim 20, wherein the elastic system comprises at least one of a silent block and a gas spring.

22. The tracked vehicle of claim 15, wherein the cab comprises a roof and a compartment obtained in the roof and inside the cab, the noise reducing system being housed in the compartment.

23. A noise reducing system for a tracked vehicle comprising a cab and at least one track that extends along a direction of travel of the tracked vehicle, the at least one track comprising a plurality of bars transverse to the direction of travel of the tracked vehicle, the noise reducing system comprising:
a control unit;
an acoustic input;
an acoustic wave emitter connected to and controlled by the control unit, the acoustic wave emitter configured to emit an acoustic equalization wave to reduce a noise generated by the at least one track, the acoustic equalization wave being phase shifted with respect to the noise and being determined based on the acoustic input;
an input configured to receive a signal correlated to a speed of travel of the tracked vehicle, wherein to reduce the noise, the emitted acoustic equalization wave is based on the signal correlated to the speed of travel of the tracked vehicle; and
a memory device that stores a plurality of sets of three values, wherein each set of three values comprises a speed value of the tracked vehicle, a frequency value of the associated acoustic equalization wave, and an amplitude value of the associated acoustic equalization wave, and the control unit is connected to the memory device and configured to define a frequency of the emitted acoustic equalization wave based on one of the sets of three values selected based on the signal correlated to the speed of travel of the tracked vehicle.

24. The noise reducing system of claim 23, wherein the acoustic input comprises a microphone connected to the control unit and configured to provide, to the control unit, a signal correlated to the noise.

25. The noise reducing system of claim 23, wherein the input is further configured to receive a signal correlated to a speed, in revolutions, of an engine of the tracked vehicle, wherein to reduce the noise, the emitted acoustic equalization wave is based on the signal correlated to the speed, in revolutions, of the engine of the tracked vehicle.

26. The noise reducing system of claim 23, wherein the input is further configured to receive a signal correlated to a radio signal of a radio system, wherein the emitted acoustic equalization wave is based on the signal correlated to the radio signal of the radio system so as not to reduce an audibility of the radio system.

27. The noise reducing system of claim 23, wherein the acoustic wave emitter comprises a loudspeaker.

* * * * *